Figure 1:
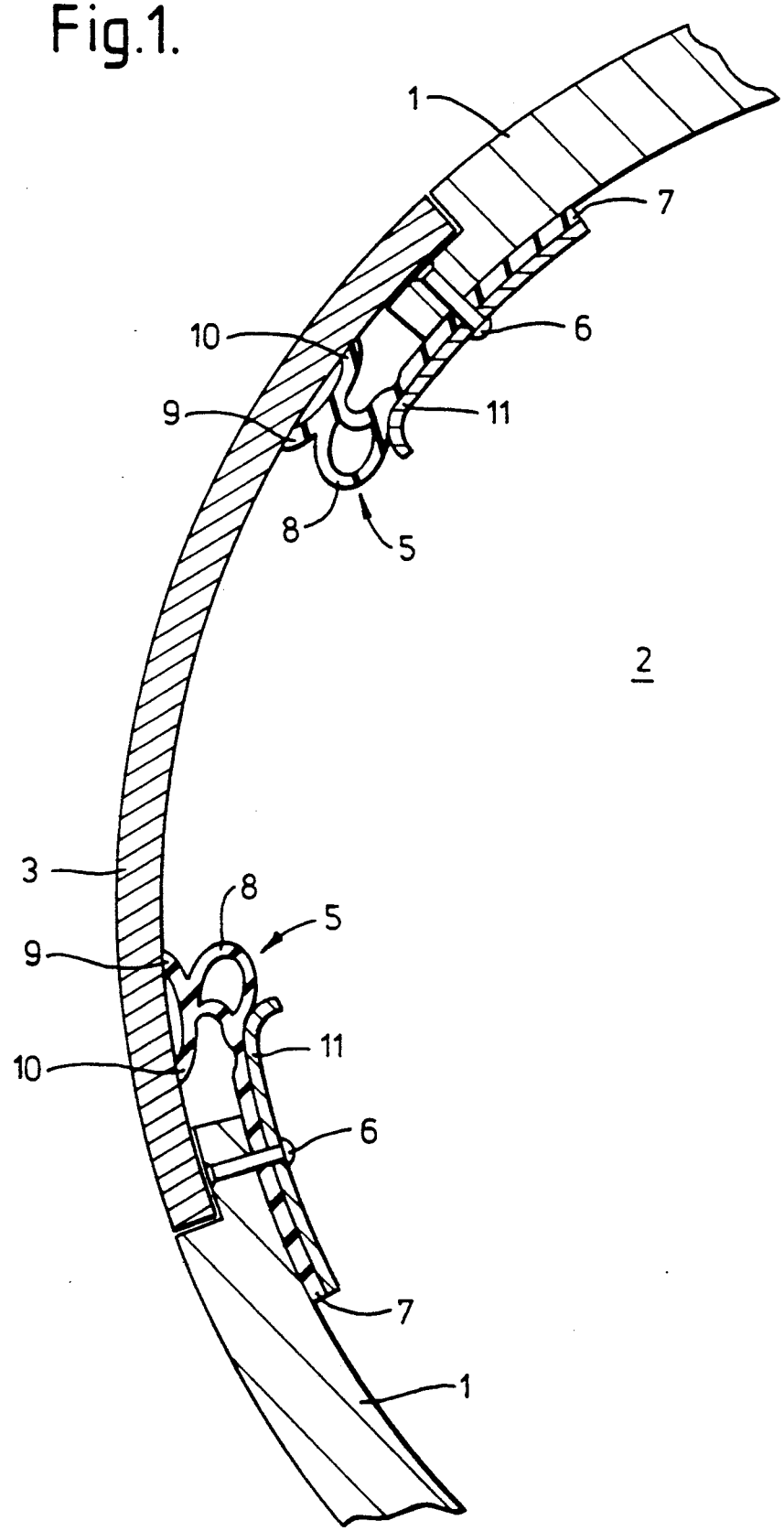

United States Patent [19]
Oliver

[11] Patent Number: 5,282,338
[45] Date of Patent: Feb. 1, 1994

[54] SEALING STRUCTURE

[75] Inventor: David J. Oliver, Preston, Great Britain

[73] Assignee: British Aerospace Public Limited Company, London, England

[21] Appl. No.: 40,572

[22] Filed: Mar. 31, 1993

Related U.S. Application Data

[63] Continuation of Ser. No. 773,326, Oct. 11, 1991, abandoned.

[30] Foreign Application Priority Data

Oct. 12, 1990 [GB] United Kingdom ............... 9022286

[51] Int. Cl.⁵ .................................................. E06B 7/16
[52] U.S. Cl. ................................ 49/476.1; 49/475.1; 49/495.1; 49/498.1
[58] Field of Search ................ 49/475, 476, 485, 493, 49/494, 495, 498, 484

[56] References Cited

U.S. PATENT DOCUMENTS

| | | | |
|---|---|---|---|
| 2,622,286 | 12/1952 | Beck | 49/498 X |
| 3,354,584 | 11/1977 | Parsons | 49/485 X |
| 4,010,573 | 3/1977 | Andrzejewski | 49/498 X |
| 4,232,081 | 11/1980 | Pullan | 49/498 X |
| 4,312,153 | 1/1982 | Parkinson et al. | 49/485 |
| 4,628,639 | 12/1986 | Lownsdale | 49/498 |
| 4,769,950 | 9/1988 | Ogawa et al. | |
| 4,827,670 | 5/1989 | Kogiso et al. | |
| 4,919,471 | 4/1990 | Seino et al. | 49/498 X |
| 4,984,843 | 1/1991 | Villa | 49/476 X |
| 5,029,931 | 7/1991 | Asaba et al. | 49/476 X |

FOREIGN PATENT DOCUMENTS

| | | |
|---|---|---|
| 0064682 | 11/1982 | European Pat. Off. . |
| 0172144 | 2/1986 | European Pat. Off. . |
| 2209190 | 8/1973 | Fed. Rep. of Germany . |
| 2406434 | 8/1975 | Fed. Rep. of Germany . |
| 2227166 | 11/1974 | France . |
| 214411 | 12/1983 | Japan ................................. 49/476 |
| 574470 | 1/1944 | United Kingdom . |
| 2170848 | 8/1986 | United Kingdom . |
| 2208886 | 4/1989 | United Kingdom . |
| 2226846 | 7/1990 | United Kingdom . |

OTHER PUBLICATIONS

English Abstract of Takayo Chikaraishi Japanese laid open application No. 57-30640, Feb. 1982.
English Abstract of Egawa et al Japanese laid open application No. 58-156436, Sep. 1983.

Primary Examiner—Peter M. Cuomo
Assistant Examiner—Jerry Redman
Attorney, Agent, or Firm—Cushman, Darby & Cushman

[57] ABSTRACT

A seal (5) suitable for sealing a door (3) to an aircraft fuselage (1) and which also acts as a rain channel when the door (3) is open. In one embodiment the seal (5) is of unitary construction and made from high tear strength silicone rubber. It comprises a flange region (7) for attachment to the fuselage (1) and a hollow compressible bulb (8) which connects the flange (7) with a pair of sealing lips (9,10). The invention has the advantage of providing an effective seal for doors having uneven inner surfaces.

4 Claims, 2 Drawing Sheets

SEALING STRUCTURE

This is a continuation of application Ser. No. 07/773,326, filed on Oct. 11, 1991, which was abandoned upon the filing hereof.

This invention relates to sealing structures, for aircraft doors for example, and particularly to seals which unfold to form a gutter for collecting rainwater when the door is open.

Some types of aircraft door are reinforced in certain areas with a honeycomb structure thereby giving the door a non-uniform cross-section. It is an object of this invention to provide a seal which will accommodate such non-uniformities in the door to be sealed.

The present invention therefore comprises a sealing structure for an aircraft consisting of a pliable sealing strip having a first part forming a flange for connection to an aircraft fuselage;

a second part forming inner and outer lips for abutment against an inner face of an aircraft door;

a third part defining a hollow region and connecting the first and second parts and whereby, when the door is open, a rain channel is formed between the outer lip and part of the flange.

The invention has been found to provide adequate sealing for doors having uneven inner surfaces. (Such as doors with honeycomb reinforcements).

A further advantage of this invention is that it has been found to provide adequate sealing for doors whose direction of closing changes as the door's inner surface makes initial contact with the inner and outer lips.

The thickness of the flange may be varied along its length to accommodate any irregularities in the aircraft fuselage outer surface.

Preferably the sealing strip is made from high tear strength silicone rubber.

Preferably the strip is moulded in one piece after being extruded, and then it is cured.

The invention is particularly useful for sealing access panels to electrical equipment bays where it is essential that rain water be prevented from running off the fuselage and onto equipment. In such cases the sealing strip is preferably fixed to the upper and side walls of the equipment bay.

Figure 2:
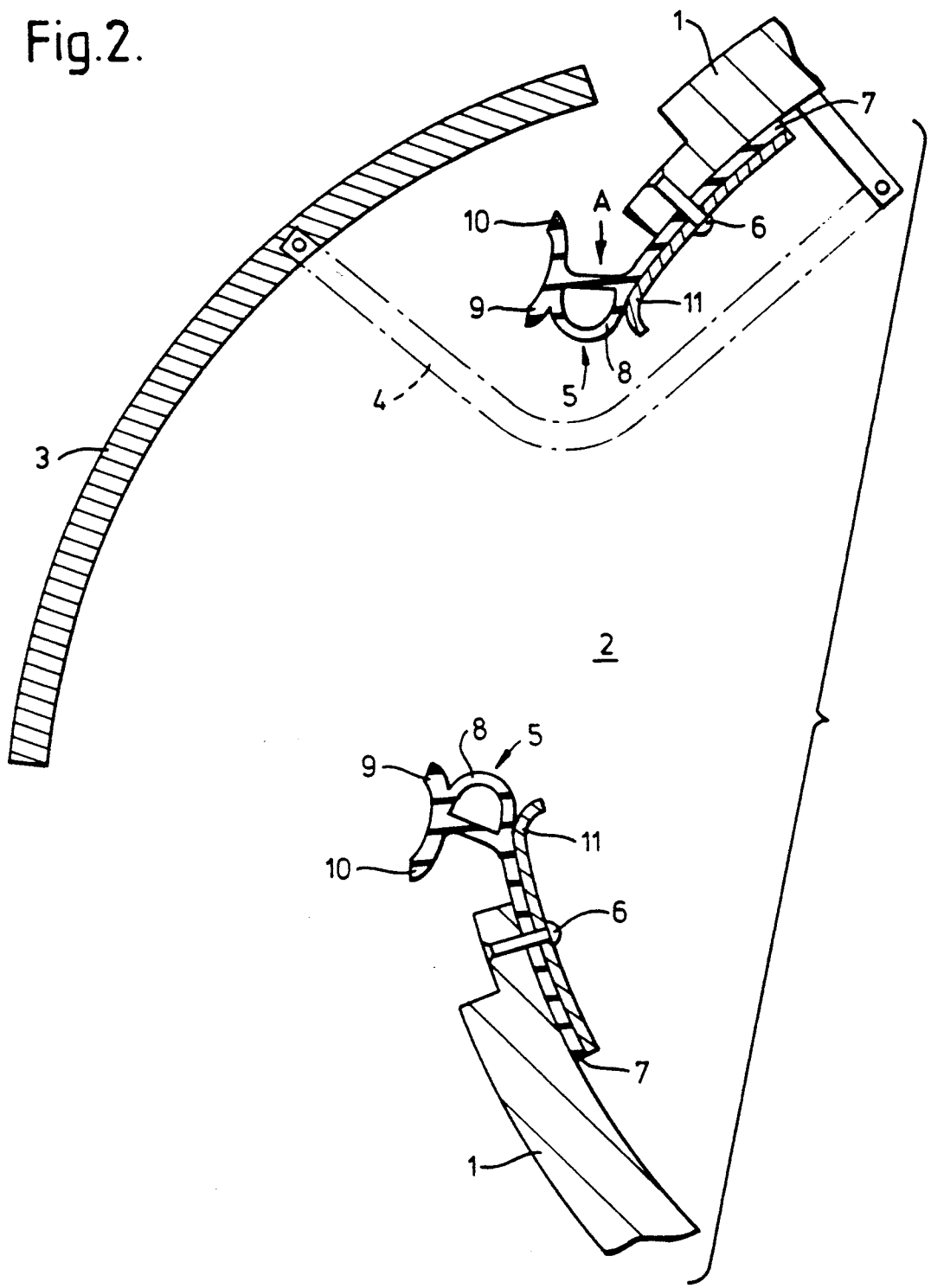

An embodiment of the invention will now be described, by way of example only, with reference to the drawings of which:

FIG. 1 and FIG. 2 are cross-sections through an aircraft fuselage incorporating a seal in accordance with the invention.

In FIGS. 1 and 2 an aircraft fuselage 1 is cut away to form an equipment bay 2. A bay door 3 is attached to the fuselage 1 by two hinges (one of which is shown ghosted and given the reference numeral 4 in FIG. 2)

Around the sides of the fuselage defining the bay 2 is secured a sealing strip 5 made from silicone rubber. The strip 5 is attached to the fuselage 1 by a series of rivets 6 which perforate a part of the strip 5 forming a flange 7. The remainder of the strip 5 comprises a hollow compressible bulb 8 which connects the flange 7 with inner and outer lips 9 and 10. A rigid metal backing strip 11 is riveted onto that side of the flange 7 remote from the fuselage 1. When the bay door 3 is closed (see FIG. 1) the bulb 8 is compressed against the backing strip 11 and the inner and outer lips 9 and 10 abut the door 3 to form a seal. The bulb 8 serves to give some strength to the inner lip 9 which in turn acts as a lever to cause the outer lip 10 to seal tightly against the door 3.

When the door 3 is open (see FIG. 2) the bulb 8 opens up allowing the outer lip 10 to protrude outwards away from the fuselage 1. Thus the region 'A' between the outer lip 10 and lower part of the flange 7 acts as a rain channel for rainwater running off the fuselage 1.

I claim:

1. A sealing structure for sealing an aircraft door having an uneven inner face comprising:
   a first portion including a flange for connection to a fuselage of and aircraft;
   a permanently enclosed resilient portion having first and second ends and defining a hollow region connected to the first portion at said first end thereof; and
   first and second lips protruding in opposite directions from said second end of said enclosed resilient portion for abutment against said door inner face,
   a rain channel defined between the second lip and a portion of the flange,
   said enclosed resilient portion being operative to urge said first and second lips into sealing contact with said inner surface of said door upon closing the door,
   said first and second lips being sized so as to seal said aircraft door notwithstanding its said uneven inner face.

2. A sealing structure as claimed in claim 1, wherein the sealing structure is made from silicone rubber.

3. A sealing structure as claimed in claim 1, wherein the sealing structure is of unitary construction.

4. A sealing structure as claimed in claim 1, 2 or 3 further comprising a rigid metal backing strip attached to said flange.

* * * * *